(12) United States Patent
Miyazawa

(10) Patent No.: US 8,347,779 B2
(45) Date of Patent: Jan. 8, 2013

(54) ROTARY ACTUATOR

(75) Inventor: Kazuki Miyazawa, Tokyo (JP)

(73) Assignee: Koganei Corporation, Tokyo (JP)

( * ) Notice: Subject to any disclaimer, the term of this patent is extended or adjusted under 35 U.S.C. 154(b) by 873 days.

(21) Appl. No.: 12/520,278

(22) PCT Filed: Aug. 21, 2007

(86) PCT No.: PCT/JP2007/066206
§ 371 (c)(1),
(2), (4) Date: Jun. 19, 2009

(87) PCT Pub. No.: WO2008/075481
PCT Pub. Date: Jun. 26, 2008

(65) Prior Publication Data
US 2010/0018387 A1 Jan. 28, 2010

(30) Foreign Application Priority Data

Dec. 21, 2006 (JP) .................. 2006-343980

(51) Int. Cl.
*F15B 15/06* (2006.01)
*F16C 19/00* (2006.01)
(52) U.S. Cl. .......................................... 92/136
(58) Field of Classification Search ............. 92/136, 92/30, 31
See application file for complete search history.

(56) References Cited

U.S. PATENT DOCUMENTS

| 6,003,431 A | * | 12/1999 | Bertini ........................ 92/136 |
| 6,547,258 B2 | * | 4/2003 | Mandokoro et al. ......... 279/4.12 |
| 6,910,409 B2 | * | 6/2005 | Yamamoto .................... 92/136 |
| 2006/0280394 A1 | * | 12/2006 | Michioka et al. ............. 384/588 |

FOREIGN PATENT DOCUMENTS

| JP | 478328 | 7/1992 |
| JP | 893757 | 4/1996 |
| JP | 10-259804 A | 9/1998 |
| JP | 10259804 A | * 9/1998 |
| JP | 2002130208 | 5/2002 |
| JP | 2003311565 | 11/2003 |
| JP | 2004316711 | 11/2004 |
| JP | 2004316711 A | * 11/2004 |
| JP | 200797291 | 4/2007 |

OTHER PUBLICATIONS

Japanese Office Action dated Sep. 13, 2011 corresponding to the Japanese patent application.
International Search Report for PCT/JP2007/066206.
Supplementary European search report dated May 16, 2011.
An Office Action from corresponding European Appln. No. 07 792 805.9 dated Aug. 22, 2012 (6 pages).

* cited by examiner

*Primary Examiner* — Thomas E Lazo
(74) *Attorney, Agent, or Firm* — McCormick, Paulding & Huber LLP

(57) ABSTRACT

In cylinder chambers 14 and 15 of a housing 10 constituting an actuator main body 13, racks 17 and 18, to both end portions of which piston portions 17a and 18a are provided, are reciprocably incorporated. A pinion 25 meshing with the racks 17 and 18 is provided on a rotary shaft 24 rotatably mounted to the housing 10. An inner ring 32 is incorporated inside an outer ring 41 fixed to the housing 10, and the inner ring 32 is attached to the rotary shaft 24 and rotates and drives a swung member. Rollers 43 serving as rolling elements are incorporated between an inner peripheral surface of the outer ring 41 and an outer peripheral surface of the inner ring 32, and the rotary shaft 24 and the inner ring 32 are rotatably supported by the outer ring 41 via the rollers 43.

8 Claims, 2 Drawing Sheets

ROTARY ACTUATOR

TECHNICAL FIELD

The present invention relates to a rack-and-pinion type rotary actuator, in which reciprocation of pistons causes a table to be rotated, reciprocated, and swung.

BACKGROUND ART

A rotary actuator driven by working fluid such as air includes a vane type rotary actuator, in which vanes are assembled to a rotary shaft accommodated in a cylindrical housing so that the rotary shaft can be rotated by supplying the working fluid to the housing, and a piston type rotary actuator, in which a linear motion of a piston actuated by supplying the working fluid to a cylinder chamber is converted to a rotary motion by a conversion mechanism.

The piston type rotary actuator includes a rack-and-pinion type rotary actuator, in which a rack and a pinion are incorporated as a mechanism that converts the linear motion to the rotary motion (for example, see Patent Document 1). This rack-and-pinion type rotary actuator is widely used in various applications since, for example, its region where the working fluid leaks out is few in number and its durability is high.

The rack-and-pinion type rotary actuator has two cylinder chambers, which are parallel to each other, and pistons are reciprocably accommodated in the respective cylinder chambers. The respective pistons are provided with racks, and, between the racks opposed to each other, a pinion meshing with both of the racks is provided on a shaft part integrated with the table. The working fluid is alternately supplied to both of the cylinder chambers, and the respective racks are caused to reciprocate in opposite directions, whereby the table can be reciprocably swung within a predetermined angle range.

As described in Patent Document 1, to the shaft part of the pinion, a bearing fitted in the housing are assembled, and the table, on which a workpiece, and a jig, etc. are mounted and which drives them, is coupled. When the working fluid is alternately supplied to both of the cylinder chambers in a state in which the jig etc. is attached to the table, a predetermined operation can be performed by rotating the workpiece, and jig, etc.

Patent Document 1: Japanese Patent Application Laid-Open Publication No. 2002-130208

DISCLOSURE OF THE INVENTION

Problems to be Solved by the Invention

Such rack-and-pinion type rotary actuators are attached to various production apparatuses etc. and used therein, and it is desired to make the rotary actuator thin and make its height dimension small in order to improve an attaching property to the production apparatus. However, in order to support each of both ends of the shaft part integrated with the table, two bearings have been conventionally provided between the housing and the shaft part, so that reduction of a thickness dimension, i.e., a height dimension of the rotary actuator in an axial direction of the shaft part has been limited.

If the bearing supporting the shaft part by a tip side opposite to the table side is eliminated to be able to support the shaft part only by the table side, thickness of the rotary actuator can be made smaller correspondingly to the elimination. However, rotation accuracy of the shaft part and the table is lowered, and durability of the rotary actuator deteriorates.

An object of the present invention is to achieve reduction of thickness of a rotary actuator.

Means for Solving the Problems

A rotary actuator according to the present invention comprises: a housing forming a cylinder chamber therein, the cylinder chamber axially reciprocably accommodating a rack to both ends of which piston portions are provided; a rotary shaft rotatably mounted in the housing, and provided with a pinion meshing with the rack; an outer ring fixed to an outer surface of the housing; an inner ring incorporated inside the outer ring and attached to the rotary shaft to rotate and drive a swung member; and a rolling element mounted between an inner peripheral surface of the outer ring and an outer peripheral surface of the inner ring, wherein the rotary shaft and the inner ring are rotatably supported by the outer ring via the rolling element.

The rotary actuator according to the present invention is such that a through-hole penetrating axially is formed in the rotary shaft.

The rotary actuator according to the present invention is such that wherein two cylinder chambers, each of which axially reciprocably accommodates the rack to both ends of which piston portions are provided, are formed in the housing, and the respective racks accommodated in the two cylinder chambers mesh with the pinion.

The rotary actuator according to the present invention is such that an outer end face of the inner ring, into which the swung member is mounted, is set so as to be substantially identical to an outer end face of the outer ring.

The rotary actuator according to the present invention is such that a flange provided on the drive shaft so as to radially outwardly extend is caused to abut on an inner end face of the inner ring, and the inner ring and the rotary shaft are attached by a screw member fastened to the flange.

The rotary actuator according to the present invention is such that the rolling element is a cross-roller.

Effect of the Invention

According to the present invention, the pinion meshing with the rack, to both end portion of which the piston portions are provided and which is reciprocably provided in the housing, is provided on the rotary shaft; the inner ring for swinging the swung member is attached to the rotary shaft and is disposed inside the outer ring fixed to the housing; and the rolling elements are disposed between the inner ring and the outer ring. Therefore, the rotary shaft is also supported by the outer ring via the rolling elements, whereby as compared with the case in which the rotary shaft is supported by the bearings attached to the housing, a dimension of the rotary actuator with respect to a direction of the rotary shaft can be reduced, and reduction of thickness of the rotary actuator can be achieved.

Moreover, since the inner ring and the rotary shaft are directly supported by the outer ring via the rolling elements, attachment accuracy and attachment rigidity of the inner ring with respect to the housing can be improved. One or two racks meshing with the pinion may be provided in the housing.

BEST MODE FOR CARRYING OUT THE INVENTION

Figure 1:
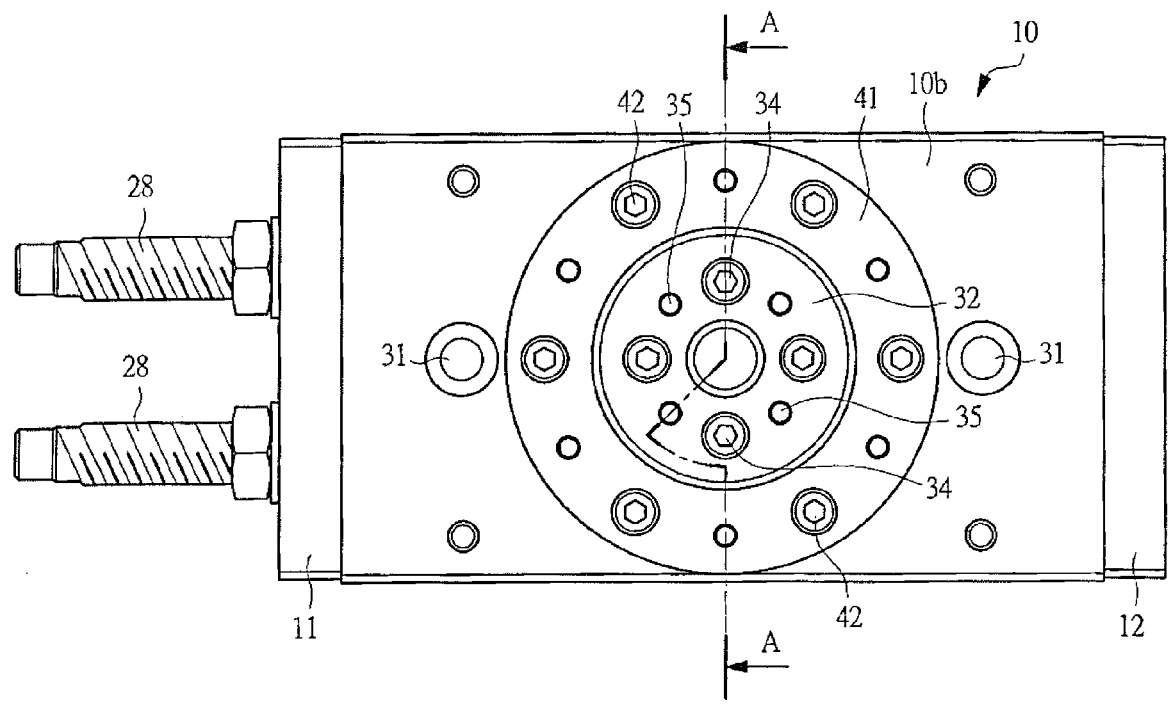
FIG. 1 is a plan view showing a rotary actuator according to an embodiment of the present invention.
Figure 2:
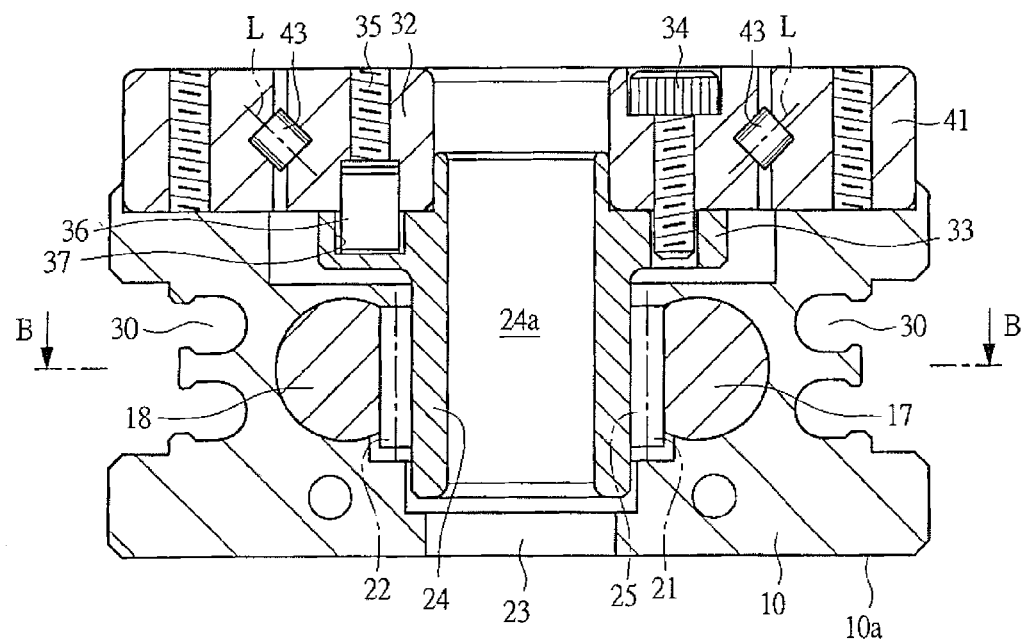
FIG. 2 is a sectional view taken line A-A of FIG. 1.
Figure 3:
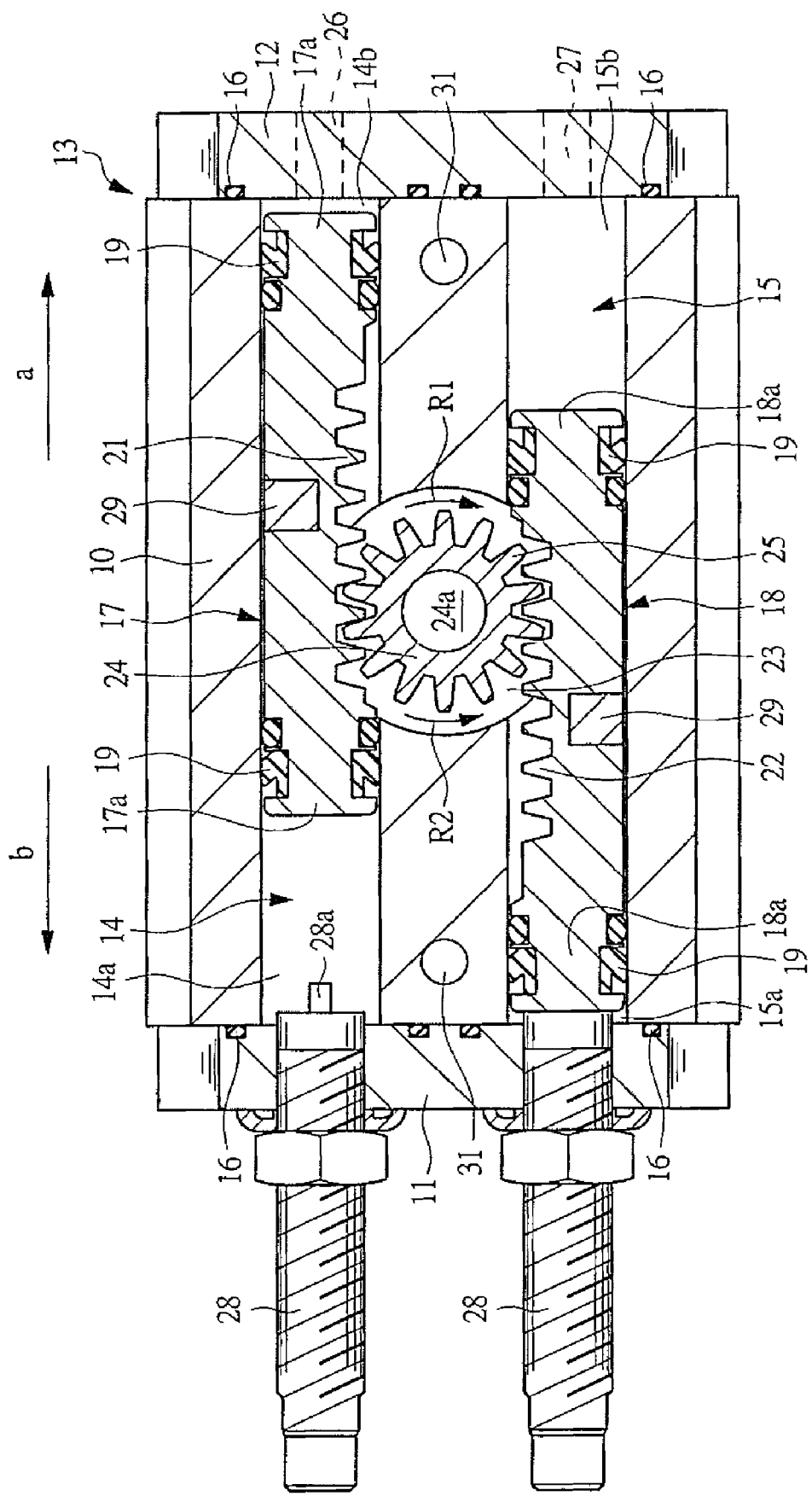
FIG. 3 is an enlarged sectional view taken line B-B of FIG. 2.

As shown in FIGS. 1 and 2, a rotary actuator has a housing 10 formed of a metal block having an approximately rectangular-parallelepiped-shape. In the housing 10, as shown in FIG. 3, two through-holes are formed substantially parallel to each other in a longitudinal direction, end plates 11 and 12 are attached to both ends of the housing 10 so as to close the through-holes, and an actuator main body 13 is formed by the housing 10 and the end plates 11 and 12. Two cylinder chambers 14 and 15 are formed in the housing 10 by the respective through-holes formed in the housing 10.

In order to seal respective regions between end faces of the housing 10 and the end plates 11 and 12, O-rings 16 are mounted into the respective end plates 11 and 12. Racks 17 and 18 are incorporated axially reciprocably in the respective cylinder chambers 14 and 15, and piston portions 17a and 18a are provided to both end portions of the racks 17 and 18 so as to be integrated with the racks 17 and 18, respectively. Seal members 19 for sealing regions between inner peripheral surfaces of the cylinder chamber 14 and 15 and the piston portion 17a and 18a are mounted into the piston portions 17a and 18a, respectively.

A plurality of teeth 21 are formed at a longitudinal-directional center portion of the rack 17, and a plurality of teeth 22 are formed at a longitudinal-directional center portion of the rack 18 so as to be opposed to the teeth 21. In a center portion of the housing 10, as shown in FIG. 2, an accommodating hole 23 penetrating in a thickness direction, i.e., a height direction of the housing 10 is formed, and the accommodating hole 23 is opened at a longitudinal-directional center portions of the respective cylinder chambers 14 and 15. A rotary shaft 24 is rotatably incorporated in the accommodating hole 23, and a pinion 25 having teeth meshing with the teeth 21 and 22 formed on the respective two racks 17 and 18 is provided on the rotary shaft 24 so as to be integral with the rotary shaft 24.

The cylinder chamber 14 is partitioned into air chambers 14a and 14b located on both axial-directional sides of the cylinder chamber 14 by the piston portions 17a provided to both end portions of the rack 17, and the cylinder chamber 15 is partitioned into air chambers 15a and 15b located on both axial-directional sides of the cylinder chamber 15 by the piston portions 18a provided to both end portions of the rack 18. In the end plate 12, a supply/discharge port 26 which communicates with the air chamber 14b and also communicates with the air chamber 15a via a flow path (not shown) formed in the housing 10 is formed, and a supply/discharge port 27 which communicate with the air chamber 15b and also communicates with the air chamber 14a via a flow path (not shown) formed in the housing 10 is formed. Therefore, if the working fluid is supplied from the supply/discharge port 27 to the air chambers 15b and 14a, then the rack 18 is driven in a direction of arrow "b", the rack 17 is driven in a direction of arrow "a", and the pinion 25 is driven to rotate in a direction of arrow "R1". On the other hand, if the working fluid is supplied to the supply/discharge port 26, then the rack 17 is driven in the direction of arrow b, the rack 18 is driven in the direction of arrow a, and the pinion 25 is driven to rotate in a direction of arrow "R2".

In this manner, the teeth 21 and 22 of the both racks 17 and 18 are opposed to each other, and the respective racks 17 and 18 mesh with the pinion 25 provided on the rotary shaft 24. Therefore, when compressed air which is the working fluid is supplied from the one-side supply/discharge port 26, the rotary shaft 24 is rotated in one direction by the pinion 25 within a predetermined angle range, and when the compressed air is supplied from the other-side supply/discharge port 27, the rotary shaft 24 is rotated in the other direction by the pinion 25 within a predetermined angle range.

In the shown rotary actuator, axial-directional thrust forces of the two racks 17 and 18 are converted to a rotational force of the rotary shaft 24 via the pinion 25. However, if the supply/discharge port 26 is caused to communicate only with the air chamber 14b and if the supply/discharge port 27 is caused to communicate only with the air chamber 15b, the rotary shaft 24 may rotate in the direction of arrow R1 by driving of the rack 18, and the rotary shaft 24 may rotate in the direction of arrow R2 by driving of the rack 17.

A swinging-reciprocating angle of the rotary shaft 24 is set by axial-directional reciprocating strokes of the racks 17 and 18. In order to reduce impulse forces applied to the housing 10 from the racks 17 and 18 when the racks 17 and 18 are driven up to positions of ends of the reciprocating strokes so that the rotary shaft 24 is swung up to its swinging-reciprocating ends, shock absorbers 28 are attached to the end plate 11 so as to correspond to end faces of the piston portions 17a and 18a that are both end portions of the racks 17 and 18, respectively. Rods 28a of the respective shock absorbers 28 are projecting into the air chambers 14a and 15a. FIG. 3 shows a state in which the rack 18 is driven up to an end of its drive-directional stroke by the compressed air supplied to the air chamber 15b. At this time, a piston end face of the rack 18 is decelerated by abutting on the rod 28a of the shock absorber 28, whereby an impulse applied to the housing 10 from the rack 18 is reduced. Similarly thereto, when the rack 17 is driven up to an end of its drive-directional stroke by supplying the compressed air to the air chamber 14b, an impulse to the rack 17 is reduced by the shock absorber 28.

The shock absorbers 28 are attached to the end plate 11 so as to absorb the impulses, which are applied to the housing 10 from the racks 17 and 18, by decelerating movements of the rods 28a using oil resistance. However, instead of the shock absorbers 28, impulse absorbing members such as rubber may be attached to an inner surface of the end plate 11.

A position detecting magnet 29 is attached to each of the racks 17 and 18. As shown in FIG. 2, two sensor attaching grooves 30 are formed in each of both side surfaces of the housing 10 so as to correspond to the respective magnets 29. When magnetic sensors are mounted into the sensor attaching grooves 30, a turn angle of the rotary shaft 24 can be detected from positions of the moved racks 17 and 18, whereby supply control of the working fluid to the supply/discharge ports 26 and 27 can be appropriately executed.

The housing 10 constituting the actuator main body 13 has the approximately rectangular parallelepiped shape as described above, so that a lower surface of the housing 10 in FIG. 2 serves as an installation surface 10a for installing the actuator main body 13 to a supporting member such as a production apparatus. An upper surface of the housing 10 serves as a supporting surface. Bolt inserting holes 31 penetrating from the supporting surface to the installation surface 10a in its thickness direction, i.e., its height direction are formed as shown in FIGS. 1 and 3, and the actuator main body 13 is fixed to the supporting member by bolts attached to the bolt inserting holes 31.

One of end portions of the rotary shaft 24 is retracted into the housing 10 rather than positioned on the installation surface 10a, and the other end portion thereof projects to the outside rather than positioned on the supporting surface of the housing 10. An inner ring 32 is fitted around such a projecting end portion. A flange 33 provided on the rotary shaft 24 so as to extend radially outwardly is caused to abut on a lower-side end face of the inner ring 32. The inner ring 32 is fastened to the flange 33, i.e., the rotary shaft 24 by four screw members 34, which axially penetrate through the inner ring 32 and are screwed into the flange 33.

The inner ring 32 has a function as a table for swinging, rotating, and driving a swung member such as a workpiece or jig, and four screw holes 35 for attaching the swung member are formed, as shown in FIG. 1, in an outer surface of the inner ring 32. Fitting holes larger in diameter than the screw holes 35 are formed in the inner ring 32 so as to be coaxial with the screw holes 35, respectively. Engagement pins 36 are attached into the fitting holes. The engagement pins 36 project from an inner end face of the inner ring 32 and are engaged with engagement holes 37 formed in the flange 33.

As shown in FIG. 1, an outer ring 41 is fixed to the supporting surface of the housing 10 by six hexagon socket head cap screws 42, and a head part of each of the screws 42 is retracted into the outer ring 41 rather than positioned on a surface of the outer ring 41. The outer ring 41 is formed of an annular member having an outer peripheral surface and an inner peripheral surface which are circular, the inner ring 32 is incorporated in the outer ring 41, and an outer end face of the outer ring 41 is substantially identical to an outer end face of the inner ring 32. Incidentally, although an outer peripheral surface of the outer ring 41 is circular, a shape of the outer peripheral surface may be square or rectangular.

An annular groove is formed in each of an inner peripheral surface of the outer ring 41 and an outer peripheral surface of the inner ring 32, and many rollers 43 serving as rolling elements are mounted in an annular space, which has a substantially square cross-section and is formed by both of the grooves. While rotating about a rotary central axis shown by the reference numeral "L" in FIG. 2, the respective rollers 43 support the inner ring 32 which rotates with the rotary shaft 24, and support thrust-directional loads that are axially applied to the inner ring 32 and the rotary shaft 24. The rotary central axes L of the rollers 43 mounted in the annular space are inclined 45 degrees with respect to a rotary center axis of the rotary shaft 24, the rotary central axes L of the rollers 43 adjacent to each other in a circumferential direction are orthogonally intersecting with each other, whereby the rollers 43 serve as cross-rollers. Thus, the one-directional thrust load acting on the inner ring 32 is supported by half of the rollers which are disposed at every other location, and the reverse-directional thrust load thereof is supported by the remaining rollers, so that the inner ring 32 serving as a table supporting the swung member is supported by the housing 10 with high attachment rigidity, and that it becomes unnecessary to provide a bearing on a lower end side of the rotary shaft 24. Moreover, since the attachment rigidity is enhanced, rotation accuracy of the rotary shaft 24 and the inner ring 32 can be improved, and misalignment of the inner ring from the central axis during the swing and rotation of the inner ring can be eliminated.

In this manner, the rollers 43 serving as rolling elements are mounted between the outer peripheral surface of the inner ring 32 and the inner peripheral surface of the outer ring 41 to support not only the inner ring 32 but also the rotary shaft 24 via the rollers 43. Therefore, a vertical-directional height dimension, i.e., a thickness dimension of the rotary actuator shown in FIG. 2 can be suppressed, and reduction of the thickness of the rotary actuator can be achieved. Other rolling elements such as balls can be used as the above rolling elements as long as they are a type of rotatably supporting the inner ring 32 and, at the same time, transmitting the thrust load to the outer ring 41.

The rotary shaft 24 has a through-hole 24a and is attached to the inner ring 32, so that piping or wiring connected to a swung member such as a jig attached to the inner ring 32 can be incorporated inside the rotary shaft 24 and the inner ring 32. As a result, the wiring or piping is not required to lay in a periphery of the rotary actuator, whereby the periphery of the rotary actuator can be simplified. For example, when a sucking unit having a vacuum sucking pad is to be attached to the inner ring 32, piping for vacuum feeding can be incorporated inside the rotary shaft 24.

In the rotary actuator, the inner ring 32 which is incorporated inside the outer ring 41 is rotatably supported by the outer ring 41, which is fixed to the housing 10, via the rollers 43 serving as rolling elements. Therefore, it is not required to provide a bearing(s) between the rotary shaft 24 and the housing 10, and the reduction of thickness of the rotary actuator can be achieved by making small the axial-directional dimension of the rotary shaft 24 of the rotary actuator. In other words, in the rotary actuator of the present invention, the thickness of the rotary actuator is reduced as compared with a conventional case in which bearings are provided between a housing and both end portions of a shaft part attached to a table.

In addition, since the inner ring 32 is directly supported by the outer ring 41 fixed to the housing 10, attachment accuracy and attachment rigidity of the inner ring 32 with respect to the housing 10 can be improved. In other words, since the inner ring 32 larger in diameter than the rotary shaft 24 is supported by the outer ring 41 via the rolling elements without supporting the rotary shaft 24 by the bearings, the attachment accuracy and the attachment rigidity of the inner ring 32 can be enhanced. Particularly, since the cross-rollers having higher (stronger) rigidity than the thrust loads are used, the attachment accuracy and the attachment rigidity of the inner ring 32 can be further improved. Therefore, in addition to enhancing of meshing accuracy with the racks 17 and 18 and the pinion 25, deflection etc. of the inner ring 32 can be prevented even when an external force acts on the inner ring 32 from a width direction of the inner ring.

Furthermore, since the inner ring 32 and the rotary shaft 24 are separately formed so that the inner ring 32 is attached to the rotary shaft 24, required processing costs are made low. In addition, since the inner ring 32 is attached to the rotary shaft 24 by a part of the flange 33 provided on the rotary shaft 24, an inner diameter of the through-hole in the rotary shaft 24 can be increased.

As described above, the invention made by the present inventor has been specifically explained based on the embodiment, but the present invention is not limited to the above-described embodiment and, needless to say, can be variously modified within a scope of not departing from the gist thereof. For example, in the above-described embodiment, the respective piston portions 17a and 18a, which are provided to the both end portions of the pair of the racks 17 and 18 driven in a direction opposite to the housing 10, are intended to be driven by compressed air. However, a thrust force may be applied only to the piston portion located on one end portion side of each of the racks 17 and 18. The pistons 17a and 18a are integrally provided at the both end portions of the racks 17 and 18, but the racks 17 and 18 may be formed as other members separately from the piston portions 17a and 18a, and then coupled with the piston portions 17a and 18a, respectively.

INDUSTRIAL APPLICABILITY

The rotary actuator of the present invention is applied for turning a processing object or jig in a manufacturing apparatus etc. for manufacturing industrial products.

The invention claimed is:

1. A rotary actuator comprising:
a housing forming a cylinder chamber therein, the cylinder chamber axially reciprocably accommodating a rack to both ends of which piston portions are provided;
a rotary shaft rotatably mounted in the housing, and provided with a pinion meshing with the rack;
an outer ring fixed to an outer surface of the housing;
an inner ring incorporated inside the outer ring and attached to the rotary shaft to rotate and drive a swung member; and
a rolling element mounted between an inner peripheral surface of the outer ring and an outer peripheral surface of the inner ring,
wherein the rotary shaft and the inner ring are rotatably supported by the outer ring via the rolling element,
wherein a flange provided on the rotary shaft so as to radially outwardly extend is caused to abut on an inner end face of the inner ring, and the inner ring and the rotary shaft are attached by a screw member fastened to the flange.

2. The rotary actuator according to claim 1, wherein a through-hole penetrating axially through the rotary shaft is formed in the rotary shaft.

3. The rotary actuator according to claim 1,
wherein an outer end face of the inner ring, into which the swung member is mounted, is set so as to be substantially identical to an outer end face of the outer ring.

4. The rotary actuator according to claim 1,
wherein the rolling element is a cross-roller.

5. A rotary actuator comprising:
a housing forming two cylinder chambers therein, each of which axially reciprocably accommodates a rack to both ends of which piston portions are provided;
a rotary shaft rotatably mounted in the housing, and provided with a pinion meshing with the two rack;
an outer ring fixed to an outer surface of the housing;
an inner ring incorporated inside the outer ring and attached to the rotary shaft to rotate and drive a swung member; and
a rolling element mounted between an inner peripheral surface of the outer ring and an outer peripheral surface of the inner ring,
wherein the rotary shaft and the inner ring are rotatably supported by the outer ring via the rolling element,
wherein a flange provided on the rotary shaft so as to radially outwardly extend is caused to abut on an inner end face of the inner ring, and the inner ring and the rotary shaft are attached by a screw member fastened to the flange.

6. The rotary actuator according to claim 5, wherein a through-hole penetrating axially through the rotary shaft is formed in the rotary shaft.

7. The rotary actuator according to claim 5,
wherein an outer end face of the inner ring, into which the swung member is mounted, is set so as to be substantially identical to an outer end face of the outer ring.

8. The rotary actuator according to claim 5,
wherein the rolling element is a cross-roller.

* * * * *